United States Patent [19]

Stobar

[11] 4,089,556
[45] May 16, 1978

[54] MOTORCYCLE FAIRING-WINDSHIELD ASSEMBLY

[75] Inventor: Leonard T. Stobar, Los Angeles, Calif.

[73] Assignee: Kimstock, Inc., Santa Ana, Calif.

[21] Appl. No.: 745,446

[22] Filed: Nov. 26, 1976

[51] Int. Cl.² .............................................. B62J 17/04
[52] U.S. Cl. ................................ 296/78.1; 180/1 FV; 280/289 S; 280/289 H
[58] Field of Search ................... 296/78.1; 280/289 S, 280/289 H, 289 G, 772, 775; 180/1 FV

[56] References Cited

U.S. PATENT DOCUMENTS

| 3,237,961 | 3/1966 | McMullen | 280/772 |
| 3,787,088 | 1/1974 | Dreyer | 296/78.1 |

FOREIGN PATENT DOCUMENTS

| 18,811 | 7/1898 | Austria | 296/78.1 |
| 1,161,930 | 12/1958 | France | 280/289 S |

*Primary Examiner*—Joseph F. Peters, Jr.
*Assistant Examiner*—John A. Carroll
*Attorney, Agent, or Firm*—Edward A. Sokolski

[57] ABSTRACT

A fairing for a motorcycle has a windshield attached thereto, this windshield having a central portion which is fixedly attached to the fairing and side wing portions which are hinged to the central portion to form articulated units. The articulated side windshield portions are connected to the steering column of the motorcycle on which the fairing is mounted through a suitable coupling mechanism and cable, such that when the steering column is turned one way or the other, an appropriate one of the side window portions is rotated outwardly to avoid interference with the handlebar. This enables the placement of the fairing and the windshield closer to the rider, thereby affording improved protection from the wind. Further, the fairing is shaped with downwardly deflecting scoops which deflect the air stream downwardly in a manner such as to minimize wind resistance.

8 Claims, 6 Drawing Figures

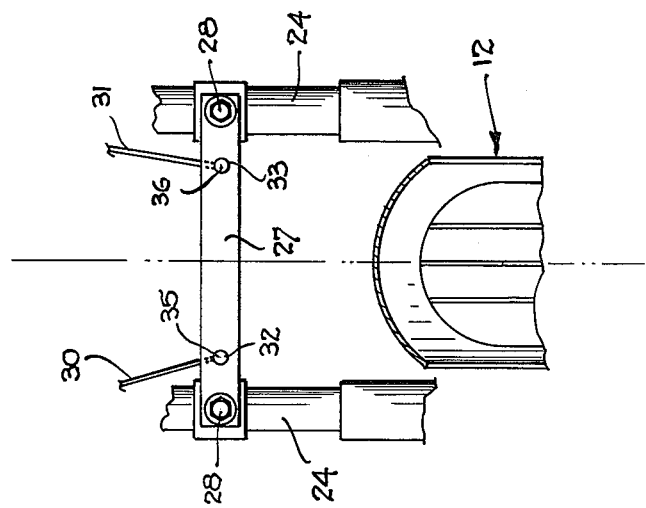
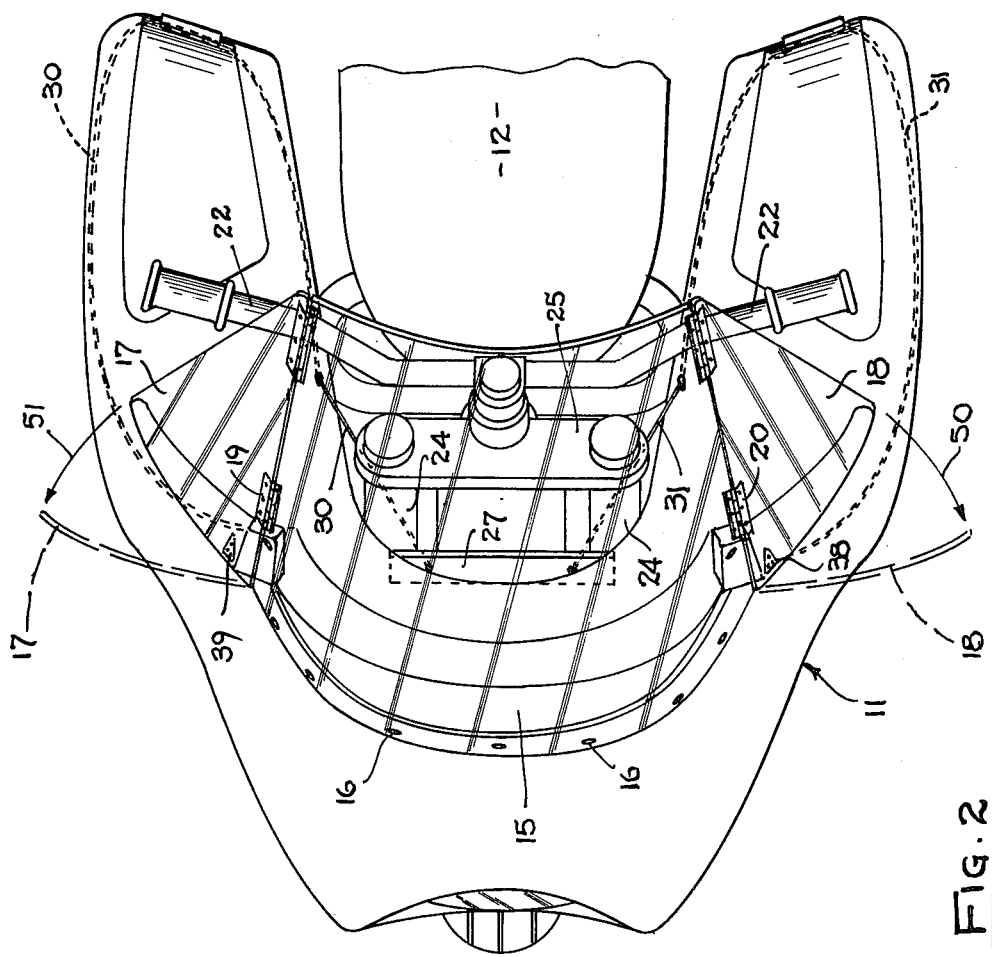

MOTORCYCLE FAIRING-WINDSHIELD ASSEMBLY

This invention relates to fairing-windshield assemblies, and more particularly to such an assembly employing a windshield having articulated side wing portions.

In the design of a fairing-windshield assembly for a motorcycle, it is desirable to mount this assembly on the cycle so that it is as close as possible to the rider so as to provide maximum protection from the wind and minimum wind resistance. The closeness to the rider of the placement of the windshield is limited in devices of the prior art by virtue of the fact that if the windshield is placed too close in, it will interfere with the turning movement of the handlebar. Such interference of course can be avoided by limiting the rearward extent of the side portion of the windshield, but this lessens the wind protection afforded.

The device of the present invention enables the placement of the windshield and fairing assembly substantially closer to the rider than in the prior art without necessitating the aforementioned limitations on the extent of the side windshield portions and yet avoiding interference with the handlebars. This end result is achieved by mounting the side windshield portions which are attached to a central windshield portion in articulated fashion, these side windshield portions being automatically rotated outwardly when the motorcycle is turned, this in a manner such as to avoid interference with the handlebar. The device of the present invention also has an improved aerodynamic design for the fairing which directs the wind stream downwardly to provide an optimum airflow with minimum wind resistance.

It is therefore an object of this invention to increase the wind protection provided by a motorcycle fairing-windshield assembly.

It is a further object of this invention to provide a fairing-windshield assembly for a motorcycle having improved aerodynamic design.

It is still another object of this invention to enable the mounting of a motorcycle fairing-windshield assembly closer to the rider while avoiding interference with the handlebar during turning maneuvers.

Other objects of this invention will become apparent as the description proceeds in connection with the accompanying drawings, of which:

FIG. 2 is a top plan view of the preferred embodiment;

FIG. 3 is an elevational view illustrating the connection of the windshield control cables to the steering column in the preferred embodiment;

Briefly described, my invention is as follows: A fairing is fixedly attached to a motorcycle and has a central windshield portion which is fixedly attached thereto and which extends upwardly therefrom. A pair of windshield side portions or wings are hinged to the central portion in articulated fashion. A separate cable is coupled to each of said windshield side portions by means of a coupler arm which is fixedly attached at one end thereof to its associated windshield side portion, and resiliently attached to the fairing structure at the other end thereof by means of a spring, the cable being connected to the end of the arm at which the spring is located. The other end of each of the cables is connected to the motorcycle steering column. When the steering column is turned in one direction, the windshield side portion adjacent to the end of the handlebar which is moved towards this side portion is moved outwardly away from the handlebar by virtue of the action of its associated cable and coupler arm, such as to avoid interference with the handlebar. Similarly, when the steering column is turned in the opposite direction, the opposite side windshield portion will be moved outwardly to avoid such interference with the opposite end of the handlebar. The fairing is constructed with downwardly contoured scoops which urge the windstream downwardly so as to minimize wind resistance.

Figure 1:
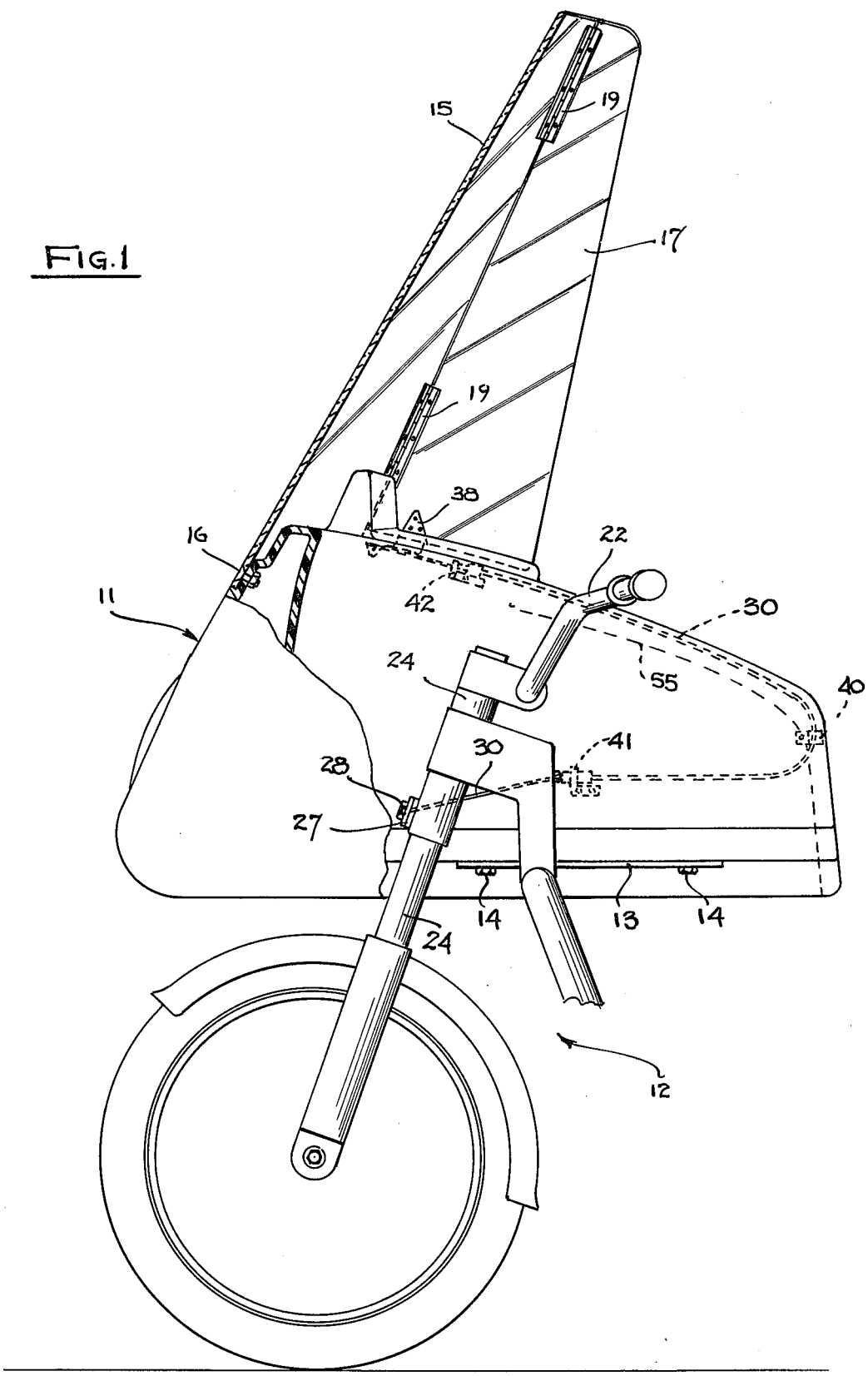
FIG. 1 is a side elevation view with partial cutaway section of a preferred embodiment of the invention as installed on a motorcycle.

Referring now to FIGS. 1-3, a preferred embodiment of the invention is illustrated. Fairing 11 which is preferably fabricated of suitable durable plastic material, is fixedly attached to the frame of motorcycle 12 by means of mounting brackets 13, the fairing being attached to these brackets by means of bolts and nuts 14. Central windshield portion 15 is fixedly attached to the top of fairing 11 by means of bolts 16. Windshield side portions or wings 17 and 18 are connected to the opposite side edges of central windshield portion 15 in articulated fashion by means of hinges 19 and 20 respectively. Motorcycle handlebar 22 is fixedly attached to forked steering column 24 by means of bar 25 and associated hardware.

As best shown in FIG. 3, a cross bar 27 is attached between the arms of steering column 24 by means of bolts 28. Cables 30 and 31 are fitted through apertures 32 and 33 respectively, which are formed in cross bar 27, ball members 35 and 36, which are larger than apertures 32 and 33, being attached to the ends of the cables to prevent the cables from slipping out of the apertures once they have been installed therein.

Figure 4:
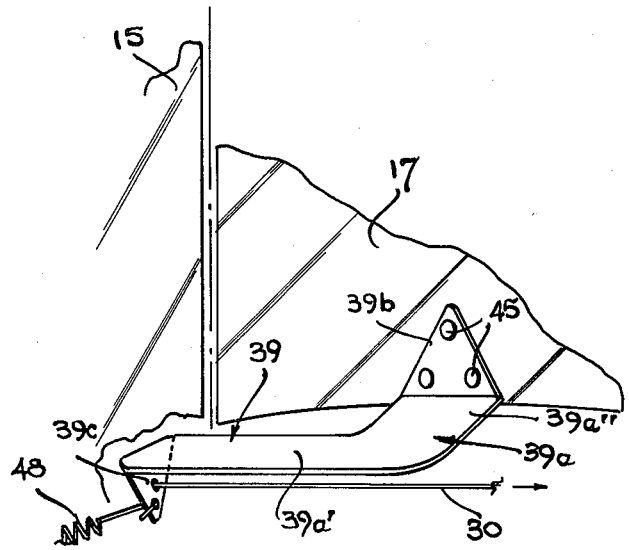
FIG. 4 is a perspective view illustrating the coupler mechanism for coupling the control cable to the windshield side portions in the preferred embodiment.
Figure 5:
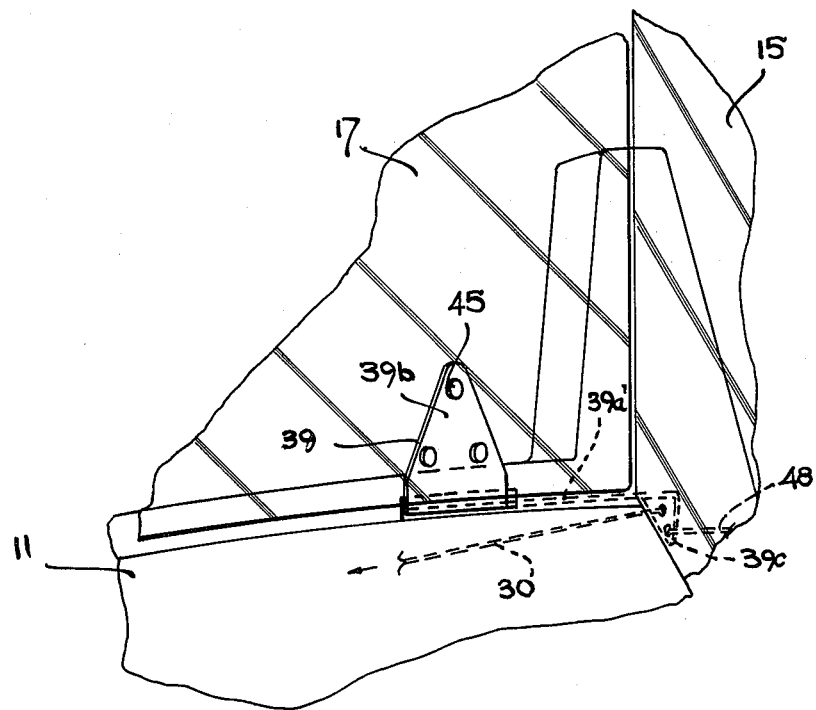
FIG. 5 is a side elevational view illustrating the attachment of the coupler mechanism of FIG. 4 to the windshield articulated portion.

Cables 30 and 31 run from cross bar 27 through guides 40 to associated arm members 38 and 39 respectively. The cables are retained and adjusted by means of retainer and adjuster members 41 and retained by retainer members 42. As can best be seen in FIG. 4, which shows coupler arm member 39 which is identical in configuration to arm member 38, this arm member has a central portion 39a which has two flat right angled sections 39a' and 39a", with a first end portion 39b which extends upwardly substantially perpendicularly to section 39a", and downwardly extending end portion 39c which extends substantially perpendicularly from section 39a'. End portion 39b is bolted to side windshield portion 18 by means of bolts 45. End portion 39c is resiliently connected to the fairing 11 by means of spring 48 which engages in an aperture formed in portion 39c and an aperture in the fairing (not shown). Cable 30 is fitted through an aperture formed in portion 39c and has an enlarged bulb on the end thereof to prevent the cable from escaping from the aperture once it has been installed therein. Arm member 38 is identical in construction to arm member 39.

In operation, when handlebar 22 is turned to the right (as viewed in FIG. 2), cable 31 operates to draw arm 38 against the action of spring 48 to drive windshield portion 18 outwardly on its hinge 20, as indicated by arrow 50, towards the dotted line position, thereby avoiding interference between the handlebar and windshield. When handlebar 22 is turned to the left, cable 30 operates to draw window portion 17 outwardly to the dotted line position as indicated by arrow 51, to avoid interference with the ends of the handlebar. Thus, the side window portions are automatically moved outwardly to avoid interference with the handlebar during turning maneuvers.

Figure 6:
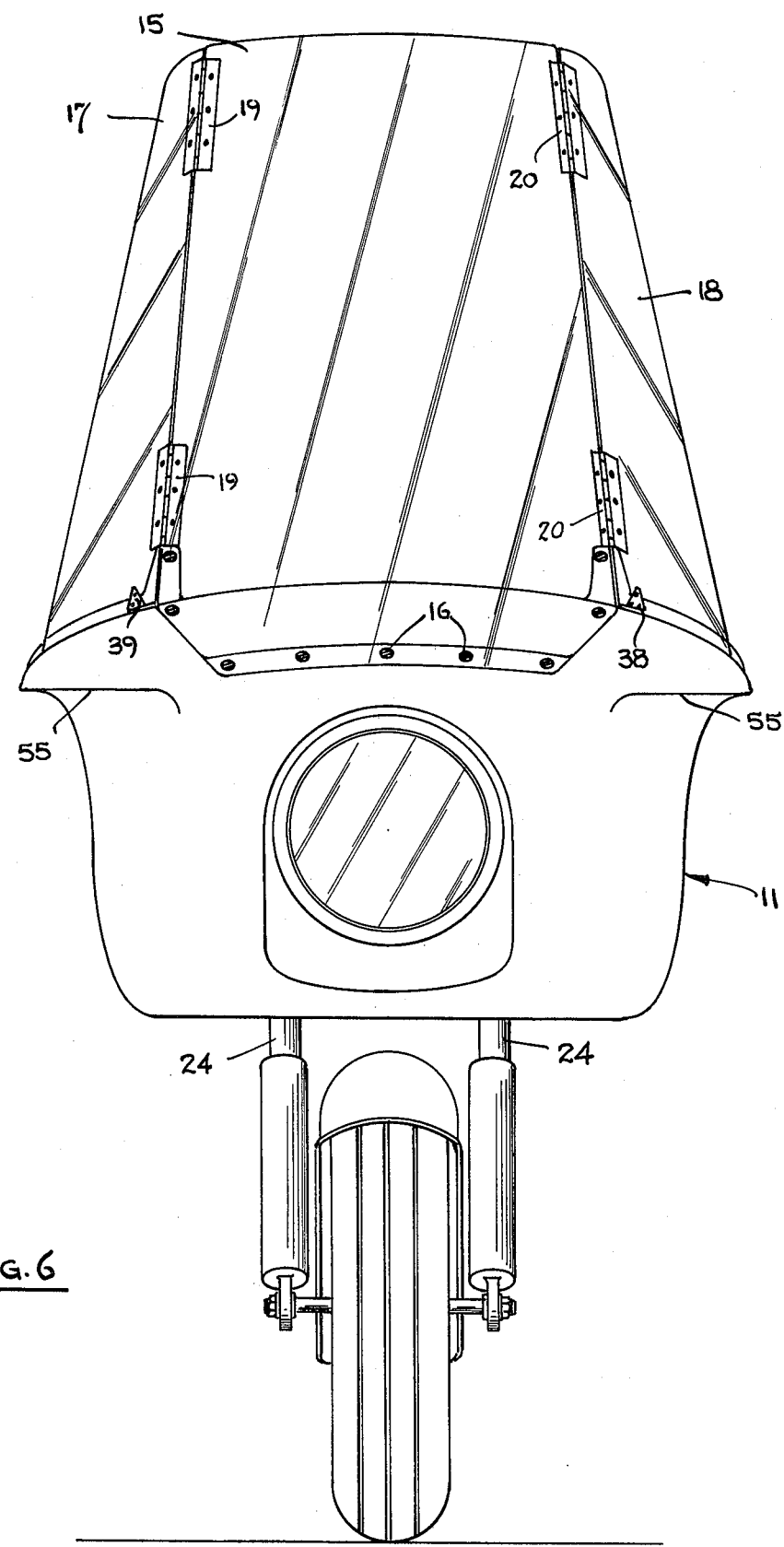
FIG. 6 is a front elevational view of the preferred embodiment.

Fairing 11 has side scoops 55, as can best be seen in FIG. 6, which direct the windstream downwardly along the sides of the fairing, thereby providing improved aerodynamic characteristics and minimizing wind resistance.

While the invention has been described and illustrated in detail, it is to be clearly understood that this is intended by way of illustration and example only and is not to be taken by way of limitation, the spirit and scope of this invention being limited only by the terms of the following claims.

I claim:

1. A fairing-windshield assembly for use on a motorcycle or the like, comprising:
    a windshield central portion,
    a windshield side portion pivotally attached to each of the opposite side edges of said central portion to form articulated side wing units,
    a fairing adapted to be fixedly attached to a motorcycle, said windshield central portion being mounted on said fairing, and
    means for connecting said windshield side portions to the steering mechanism of said motorcycle, said connecting means including for each windshield side portion a cable connected to the steering mechanism of the motorcycle and coupler means for coupling the cable to the windshield side portion, whereby when said steering mechanism is turned in one direction, one of said windshield side portions is drawn outwardly to avoid interference with said steering mechanism, and when the steering mechanism is turned in a direction opposite to said one direction, the other of said windshield side portions is drawn outwardly to avoid interference with said steering mechanism.

2. The assembly of claim 1 wherein the means for connecting each of said windshield side portions to said windshield central portion comprises a cable connected at one end thereof to the motorcycle steering column, coupler means attached to an associated one of said side portions, and means for resiliently attaching the coupler means to the fairing, the other end of the cable being attached to the coupler means.

3. The assembly of claim 1 wherein said fairing includes downwardly contoured scoop means for urging the ambient wind stream downwardly.

4. In combination,
    a motorcycle having a steering column and a handlebar connected to said steering column for effecting the turning thereof,
    a fairing fixedly attached to said motorcycle,
    a windshield central portion fixedly attached to said fairing,
    a first side windshield portion pivotally attached to said central windshield portion at one edge thereof to form a first articulated side wing unit,
    a second side windshield portion pivotally attached to said central windshield portion at the edge thereof opposite said one edge to form a second articulated side wing unit,
    means for connecting said side windshield portions to the steering column of the motorcycle, said connecting means including for each of said side windshield portions, coupler means attached to the associated side windshield portion and cable means for interconnecting the steering column and said coupler means, so that when the steering column is turned in one direction, one of said side windshield portions is drawn outwardly to avoid interference with the handlebar, and when the steering column is turned in a direction opposite to said one direction, the other of said side windshield portions is drawn outwardly to avoid interference with the handlebar.

5. The combination of claim 4 wherein the means for connecting each of the side windshield portions to the steering column comprises a cable attached at one end thereof to the steering column, a coupler arm member fixedly attached near one end thereof to an associated one of said side windshield portions, means for resiliently coupling said coupler arm member near the other end thereof to said fairing, the other end of the cable being attached to the coupler arm member.

6. The combination of claim 5 wherein said coupler arm member has a central portion formed from two substantially flat sections substantially normal to each other, and flat end portions extending in opposite directions substantially perpendicularly from each of the opposite ends of said central portion, one of said flat end portions being attached to the associated side windshield portion, both the cable and the means for resiliently coupling the arm member to the fairing being attached to the other flat end portion.

7. The combination of claim 6 wherein the means for resiliently coupling the arm to the fairing comprises a spring interconnecting these two members.

8. The combination of claim 4 wherein said fairing includes downwardly contoured scoop means for urging the ambient wind stream downwardly.

* * * * *